(12) United States Patent
Oh et al.

(10) Patent No.: US 11,395,461 B2
(45) Date of Patent: Jul. 26, 2022

(54) METHOD FOR ENHANCING GROWTH AND USEFUL SUBSTANCES OF LEAFY VEGETABLES BY USING ENVIRONMENTAL STRESS

(71) Applicant: INDUSTRY-UNIVERSITY COOPERATION FOUNDATION OF CHUNGBUK NATIONAL UNIVERSITY, Cheongju-si (KR)

(72) Inventors: Myung Min Oh, Cheongju-si (KR); Jin Hui Lee, Cheongju-si (KR)

(73) Assignee: INDUSTRY-UNIVERSITY COOPERATION FOUNDATION OF CHUNGBUK NATIONAL UNIVERSITY, Cheongju-si (KR)

( * ) Notice: Subject to any disclaimer, the term of this patent is extended or adjusted under 35 U.S.C. 154(b) by 171 days.

(21) Appl. No.: 16/315,932

(22) PCT Filed: Jul. 7, 2017

(86) PCT No.: PCT/KR2017/007300
§ 371 (c)(1),
(2) Date: Mar. 18, 2019

(87) PCT Pub. No.: WO2018/009023
PCT Pub. Date: Jan. 11, 2018

(65) Prior Publication Data
US 2020/0178474 A1    Jun. 11, 2020

(30) Foreign Application Priority Data

Jul. 7, 2016  (KR) ................. 10-2016-0086091
Jul. 6, 2017  (KR) ................. 10-2017-0086130

(51) Int. Cl.
*A01G 7/04*   (2006.01)
*A01G 7/06*   (2006.01)
*A01N 31/08*  (2006.01)
*A01N 43/16*  (2006.01)

(52) U.S. Cl.
CPC .............. *A01G 7/06* (2013.01); *A01G 7/045* (2013.01); *A01N 31/08* (2013.01); *A01N 43/16* (2013.01)

(58) Field of Classification Search
CPC ............ A01G 7/00; A01G 7/06; A01G 7/045
USPC ...................................................... 435/420
See application file for complete search history.

(56) References Cited

U.S. PATENT DOCUMENTS

2006/0016125 A1   1/2006  Krauss et al.
2015/0030705 A1   1/2015  Che et al.

FOREIGN PATENT DOCUMENTS

KR   10-2011-0115468   10/2011

OTHER PUBLICATIONS

Rajashekar et al. Health-Promoting Phytochemicals in Fruit and Vegetables: Impact of abiotic stresses and Crop Production practices Functional Plant Science and Biotechnology 2009.*
Jin-Hui Lee et al., "Short-term Low Temperature Increases Phenolic Antioxidant Levers in Kale", Korean Journal of Horticulture, Environment, and Biotechnology, 2015, Voi. 56, No. 5, pp. 588-596.*
Jin-Hui Lee et ai., "Effect of Low Temperature Stress on Growth and Antioxidant Pbenoiic Compounds of Kale", Korean Journal of Horticulture Science & Technology, vol. 31, No. II, Oct. 2013, p. 61, document No. 45.*
Jin Hui Lee et al., "Enhancement of Antioxidant Phenolic Compounds of Kaie Leaves Sujected to Temporary Irradiation of UV-A LEDs", Korean Journal of Horticultural Science & Technology, vol. 32, No. II, Oct. 2014, p. 70, document No. 48.*
https://doee.dc.gov/service/energy-tips-commercial-buildings 2021.*
Jin-Hui Lee et al. Short-term Low Temperature increases Phenolic Antioxidant levels in Kale. Hortic. Environ. Biotechnol. 56(5) 588-596 2015.*
Jin-hui Lee et al., "Effect of Low Temperature Stress on Growth and Antioxidant Phenolic Compounds of Kale", Korean Journal of Horticulture Science & Technology, vol. 31, No. II, Oct. 2013, p. 61, document No. 45. (with English Translation).
Jin-hui Lee et al., "Effect of Low Temperature Stress on Growth and Antioxidant Phenolic Compounds of Kale", Oct. 2013 (Poster).
Jin-Hui Lee et al., "Short-term Low Temperature Increases Phenolic Antioxidant Levers in Kale", Korean Journal of Horticulture, Environment, and Biotechnology, 2015, vol. 56, No. 5, pp. 588-596.
Jin-Hui Lee, et al., "Short-term UV-A LED Irradiation Improves Growth and Phytochemicals of Kale Lants", Korean Journal of Horticultural Science & Technology, vol. 34, No. 1, May 2016, p. 96, document No. 102.
Jin Hui Lee et al., "Enhancement of Antioxidant Phenolic Compounds of Kale Leaves Sujected to Temporary Irradiation of UV-A LEDs", Korean Journal of Horticultural Science & Technology, vol. 32, No. II, Oct. 2014, p. 70, document No. 48.
Jin-Hui Lee et al., "Effect of Low Temperature Stress on Growth and Antioxidant Phenolic Compounds of Kale", Korean Journal of Horticulture Science & Technology, vol. 31, No. II, Oct. 2013, p. 61, document No. 45.
Min-Jeong Lee et al., "Growth and Accumulation of Phytochemicals of Red Leaf Lettuce Exposed to UV-A LED", Korean Journal of Horticultural Science & Technology, vol. 29, No. II, Oct. 2011, p. 82, document No. 105.
Jin-Hui Lee et al., "Combined Treatment of Low Temperature and UV-A LED Light Induces Accumulation of Phenolic Compounds in Kale", In: 2016 Annual Autumn Conference of the Korean Society for Horticultural Science, poster No. 105, Oct. 26-29, 2016.
International Search Report dated Feb. 12, 2018, in International Application No. PCT/KR2017/007300 (with English Translation).

(Continued)

*Primary Examiner* — Annette H Para
(74) *Attorney, Agent, or Firm* — H.C. Park & Associates, PLC

(57) ABSTRACT

The present invention relates to a method for enhancing growth and useful substances of leafy vegetables by using environmental stress. The environmental stress may include a low temperature stress, a light stress, and a combination thereof.

11 Claims, 13 Drawing Sheets

(56) References Cited

OTHER PUBLICATIONS

Extended European Search Report dated Jan. 21, 2020, issued in European Patent Application No. 17824579.1.
A. Brazaitytèet al. "Effect of supplemental UV-A irradiation in solid-state lighting on the growth and phytochemical content of microgreens", International Agrophysics 2015, 29, 13-22.
Yong Duck Kim et al. "The effect of cold stress on leaf surface morphology and metabolites contents of tea trees (Camellia sinensis L.)", Journal of Agriculture & Life Science 49(2), pp. 7-16, Feb. 17, 2015.
Sang-Jae Kang, "Response of Monodehydroascorbate Reductase in Lettuce Leaves Subjected to Low Temperature Stress", Journal of Life Science 2011, vol. 21, No. 3, 368-374.
Office Action dated Mar. 16, 2022, issued to Korean Patent Application No. 10-2017-0086130 (with English Translation).

* cited by examiner

METHOD FOR ENHANCING GROWTH AND USEFUL SUBSTANCES OF LEAFY VEGETABLES BY USING ENVIRONMENTAL STRESS

CROSS REFERENCE TO RELATED APPLICATIONS

This application is the National Stage Entry of International Application No. PCT/KR2017/007300, filed Jul. 7, 2017, and claims priority from Korean Patent Application No. 10-2016-0086091, filed on Jul. 7, 2016, and Korean Patent Application No. 10-2017-0086130, filed on Jul. 6, 2017, each of which is incorporated herein by reference for all purposes as if fully set forth herein.

BACKGROUND

Field

Exemplary embodiments of the present invention relates to an environment control method capable of cultivating high quality leafy vegetables.

Discussion of the Background

An interest in a diet mainly composed of vegetables containing large amounts of useful substances has been recently increased, and thus, studies for increasing the content of useful substances (e.g., phenol or antioxidant substances) in plants such as vegetables have been gradually increased. For example, application of mild abiotic stress during cultivation is generally recognized as a strategy for increasing the content of useful substances in vegetables. Although there are many study results showing an increase in the amount of useful substances in plants as a mechanism for protection against exposure to stress, the increase of the useful substances according to environmental stress has not been specifically studied in terms of enhancing the content of useful substances in crops.

SUMMARY

Applicants have discovered that cultivation of highly functional plants can be achieved through an application of environmental stress during a research for enhancing growth of leafy vegetables containing large amounts of useful substances and increasing the content of phytonutrients in the leafy vegetables.

Exemplary embodiments of the invention provide a method for enhancing growth of leafy vegetables while increasing the content of useful substances in the leafy vegetables using environmental stress.

Exemplary embodiments of the invention also provide leafy vegetables with enhanced in growth and increased in content of useful substances.

Exemplary embodiments further provide a method for enhancing growth and useful substances of leafy vegetables using environmental stress through identifying a treatment intensity, a period of application of low temperature stress, and light stress to develop a technique capable of enhancing growth of leafy vegetables containing useful substances and increasing the content of useful substances of the leafy vegetables that may be useful in a closed plant factory.

The environmental stress may include at least one of a low temperature stress and a light stress.

The useful substances may include at least one of caffeic acid, ferulic acid, and kaempferol.

The growth may include an increase in at least one of fresh weight and dry weight of the leafy vegetables.

The light stress may be applied using ultraviolet (UV) light.

The low temperature stress may be applied at a temperature of 1° C. to 5° C.

The environmental stress may include a combined stress of a low temperature and UVA light.

The low temperature may be 10° C.

The UVA light may include at least one of light having a wavelength of 370 nm and light having a wavelength of 380 nm.

The leafy vegetables may be subjected to the combined stress for 3 days.

The leafy vegetables may be harvested after treatment with the combined stress for 3 days.

The leafy vegetables may be harvested after treatment with the combined stress for 3 days and recovery for 1 day.

The useful substances may include at least one of phenol and an antioxidant substance.

The growth may include an increase in at least one of leaf area, leaf number, and chlorophyll content of the leafy vegetables.

The leafy vegetables may be grown for at least 5 weeks before an application of the environmental stress.

The leafy vegetables may be grown at a temperature of about 20° C. for at least 2 weeks before the application of the environmental stress.

The leafy vegetables may be applied with the environmental stress for at least 3 days, and then are placed in the temperature about 20° C. for at least 2 days.

The environmental stress may include a change in temperature of at least about 16° C.

The environmental stress may include a first exposure of the leafy vegetables to ultraviolet (UV) light.

In accordance with another aspect of the present invention, leafy vegetables enhanced in growth and increased in content of useful substances using the method are provided.

During cultivation, temporary low temperature treatment with respect to leafy vegetables resulted in enhancement in useful substances (phenol concentration, the degree of antioxidant, and individual phenolic compounds) and phenylalanine ammonia-lyase (PAL) activity without deterioration of growth, and application of light stress to the leafy vegetables resulted in increase in the content of the useful substances (phenol concentration, the degree of antioxidant, and individual phenolic compounds) was increased. Upon cultivation of leafy vegetables on a large scale as in a greenhouse or a plant factory or upon cultivation of leafy vegetables in a closed plant factory, temporary treatment with environmental stress, such as low temperature and UV light, can provide high quality leafy vegetables that contain useful substances.

In addition, when the leafy vegetables are subjected to combined stress of low temperature and light (UVA), the content of useful substances in the leafy vegetables can be economically and efficiently increased.

The foregoing general description and the following detailed description are exemplary and explanatory and are intended to provide further explanation of the claimed subject matter.

BRIEF DESCRIPTION OF DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION

Figure 1:
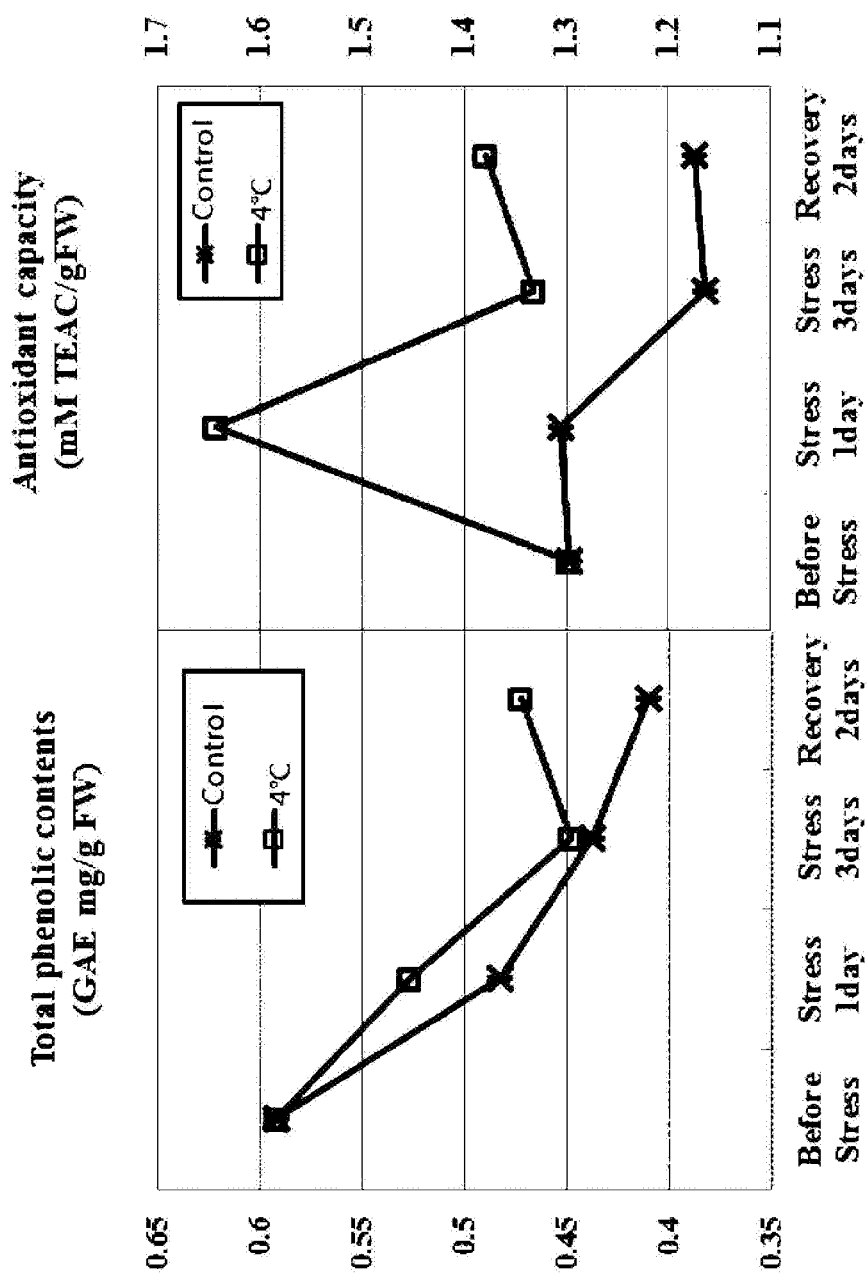
FIG. 1 is graphs depicting the phenolic content and antioxidant capacity of leafy vegetables upon low temperature treatment according to an exemplary embodiment.

Exemplary embodiments of the present invention relate to a method for enhancing growth of leafy vegetables while increasing the content of useful substances in the leafy vegetables using environmental stress.

Based on experimental results of leafy vegetables having enhancement in growth and useful substances according to exemplary embodiments, the content of useful substances increased without deterioration in growth of the plants when leafy vegetables were additionally subjected to low temperature treatment at 4° C. for 3 days, or irradiated with UV at 30 W/m$^2$ during cultivation. In addition, since the low temperature or UV irradiation treatment was performed under low stress conditions that do not significantly affect the growth of the plants, it has been confirmed that the plants accumulated the useful substances as a mechanism for protection against such treatment.

Hereinafter, leafy vegetables according to exemplary embodiments will be described with reference to a kale (*Brassica oleracea* var.*acephala*.).

Kale belongs to the Brassicaceae family and produces a rosette of elongated leaves with wavy to crippled edges. Kale grows for a long period of time such that the stems thereof have a length of 60 cm or more.

According to the exemplary embodiments, the environmental stress may include low temperature stress or light stress.

For example, the light stress may include irradiation of ultraviolet (UV) light, preferably using two types of UV-A LEDs (370 nm, 385 nm) at 30 W/m$^2$, without being limited thereto.

In addition, the low temperature stress may be applied at 1° C. to 5° C., more particularly at 4° C., without being limited thereto.

According to exemplary embodiments, the growth may include an increase in fresh weight or dry weight. As used herein, increase in fresh weight refers to an increase in the weight of living leafy vegetables, and increase in dry weight refers to an increase in the weight of dried leafy vegetables, which are measured after completely drying a shoot part, a root part, or the entirety of the leafy vegetables.

According to exemplary embodiments, the useful substances may include at least one of caffeic acid, ferulic acid, and kaempferol.

"Caffeic acid" is a phenolic compound that is contained in coffee beans, fruits such as pears, and medicinal plants such as basil, thyme, verbena, tarragon, oregano, and dandelion. Caffeic acid is represented by chemical formula $C_9H_8O_4$, and has a molecular weight of 180.16 with a melting point of 223° C. to 225° C. Caffeic acid may be formed as a yellow crystal that easily dissolves in hot water and alcohol. Caffeic acid contains two hydroxyl groups and is related to cinnamic acid. Caffeic acid and cinnamic acid are carboxylic acids, in which carbon atoms form a circulation ring, and is a different compound from caffeine. Caffeic acid is typically contained in coffee beans and various plants including fruits, vegetables, herbs, and the like. Caffeic acid acts as a cancer inhibitor, and is known to act as an antioxidant inside and outside the body and to be more effective than other antioxidants.

"Ferulic acid" is a component rich in cell walls of plants, exhibits antioxidant activity to neutralize active oxygen, and has an effect of reducing blood sugar and cholesterol. Ferulic acid is represented by chemical formula $C_{10}H_{10}O$, and may be formed as a white to pale yellowish brown crystalline powder which is odorless or has a slightly peculiar odor. Ferulic acid has a molecular weight of 194. Ferulic acid can be dissolved in hot water, alcohol, or ethyl acetate. Ferulic acid is contained in plant seeds, such as wheat, oats, coffee, apples, oranges, peanuts, pineapples, and artichokes. As a precursor to lignin that forms cell walls of plants, ferulic acid has an antioxidant effect that neutralizes active oxygen, such as superoxide ions, nitrogen oxide, and hydroxy radicals, the effect which is known to be the same as that of superoxide dismutase (SOD), which protects the living body from toxicity of active oxygen. More particularly, ferulic acid has an excellent inhibitory effect on oxidation of lipids in cells. Ferulic acid has very strong antioxidant power and has a very good effect in eliminating a melanin pigment while inhibiting generation of spots and freckles, thereby providing a good cosmetic effect and an effect of reducing blood sugar and cholesterol.

"Kaempferol" may be formed as a yellow powder, and is known as one of the important flavonoids with a typical C6-C3-C6 structure. Kaempferol acts as a chemical prophylactic agent that prevents oxidation of fat and DNA, and has a strong antioxidant action while inhibiting formation of cancer cells. Kaempferol is contained in apples, onions, leeks, citrus fruits, grapes, red wines, and chili herbs. Kaempferol is represented by chemical formula $C_{15}H_{10}O_6$, and has a molecular weight of 286.24. Kaempferol may also act as a chemical prophylactic agent that forms platelets in the blood, and prevent oxidation of low density lipoprotein (LDL) to prevent arteriosclerosis, while inhibiting formation of cancer cells.

The inventive concepts provide leafy vegetables enhanced in growth and having an increased content of useful substances using the method as described above.

Upon application of low temperature treatment or UV irradiation according to exemplary embodiments, the leafy vegetables exhibit enhancement in growth, and increased content of useful substances, such as caffeic acid, ferulic acid, and kaempferol, and activity of PAL (phenylalanine ammonia-lyase), which is an important enzyme in the pathway of secondary metabolite biosynthesis, thereby providing high quality leafy vegetables.

Exemplary embodiments of the invention will be described in detail with reference to experimental results. It is contemplated that the experimental results or examples described below are provided for illustration only, and are not to be construed as limiting the scope of the inventive concepts.

EXAMPLE 1

Analysis of Enhancement in Useful Substances of Leafy Vegetables Using Low Temperature <1-1> Analysis of Growth of Leafy Vegetables Using Low Temperature For analysis of growth of leafy vegetables using low temperature, seeds of leafy vegetables seeded in a seed growth pack were grown in a growth chamber under conditions of temperature 20° C., humidity 60%, LED light sources (red:white:blue, 8:1:1), and 142 μmol/m$^2$/s PPF for 2 weeks. Then, the seedlings of the leafy vegetables were planted in a deep-flow technique (DFT) hydroponic culture system (L×W×H, 32.5 cm×22 cm×23 cm) and grown for 3 weeks. The hydroponic culture system was provided with an oxygen generator to supply oxygen to the roots of the leafy vegetables, and a nutrient solution was changed at the second week after planting. Three weeks after planting, the leafy vegetables were transferred to a chamber set to 4° C. for low temperature treatment, and after low temperature treatment for 3 days, the leafy vegetables were transferred to a normal environment and recovered for 2 days. Before and after the low temperature treatment, fresh weight and dry weight of a shoot part of the leafy vegetables were measured.

As a result, as shown in the following Table 1, although there was a slight numerical decrease in fresh weight and dry weight of a shoot part and a root part of the leafy vegetables after low temperature treatment, it was confirmed that there was no significant difference.

TABLE 1

| Time | Treatment | Shoot | | Root | |
|---|---|---|---|---|---|
| | | Fresh weight (g/plant) | Dry weight (g/plant) | Fresh weight (g/plant) | Dry weight (g/plant) |
| Before treatment | | 3.32 ± 0.11$^z$ | 0.28 ± 0.01 | 0.36 ± 0.03 | 0.03 ± 0.01 |
| Recovery | Control group | 4.68 ± 0.33 | 0.39 ± 0.04 | 0.50 ± 0.10 | 0.05 ± 0.01 |
| | Low temperature | 4.27 ± 0.42 | 0.38 ± 0.02 | 0.51 ± 0.04 | 0.05 ± 0.01 |
| | Significance | NS | NS | NS | NS |

As used herein, data$^z$ are shown as mean±standard error, and NS refers to "not significant".

<1-2> Analysis of Enhancement of Useful Substances in Leafy Vegetables Using Low Temperature For analysis of enhancement of useful substances of leafy vegetables using low temperature, seeds of leafy vegetables seeded in a seed growth pack were grown in a growth chamber under conditions of temperature 20° C., humidity 60%, LED light sources (red:white:blue, 8:1:1), and 142 μmol/m$^2$/s PPF for 2 weeks. Then, the seedlings of the leafy vegetables were planted in a deep-flow technique (DFT) hydroponic culture system (L×W×H, 32.5 cm×22 cm×23 cm) and grown for 3 weeks. The hydroponic culture system was provided with an oxygen generator to supply oxygen to the roots of the leafy vegetables, and a nutrient solution was changed at the second week after planting. Three weeks after planting, the leafy vegetables were transferred to a chamber set to 4° C. for low temperature treatment, and after low temperature treatment for 3 days, the leafy vegetables were transferred to a normal environment and recovered for 2 days. The total phenol concentration, the antioxidant degree, the amounts of individual phenolic compounds, and PAL (phenylalanine ammonia-lyase) activity of the leafy vegetables were measured before and after low temperature treatment.

As a result, as shown in FIG. 1, the total phenol concentration of the leafy vegetables in the treatment group exposed to low temperature was slightly increased on the first day of the low temperature treatment (Stress 1 day), as compared with that of the control group, and decreased again to a substantially similar value to that of the control group on the third day of the low temperature treatment (Stress 3 days). On the second day of recovery, the total phenol concentration of the leafy vegetables in the treatment group was significantly increased by about 15%, as compared with the control group. Similarly, the degree of antioxidant of the leafy vegetables in the treatment group was increased by 25% on the first day of the low temperature treatment, decreased on the third day of the low temperature treatment, and was significantly increased by about 17% at the recovery second day, as compared with that of the control group.

In addition, the amounts of individual phenolic compounds were increased by the low temperature treatment. It was confirmed that the amounts of caffeic acid and ferulic acid were increased by 46% and 70%, respectively, on the second day of recovery after the low temperature treatment, and that kaempferol not detected before the low temperature treatment was significantly detected after the low temperature treatment (see Table 2).

TABLE 2

| Treatment | Caffeic acid (mg 100 g$^{-1}$ FW) | Ferulic acid (mg 100 g$^{-1}$ FW) | Kaempferol (mg 100 g$^{-1}$ FW) |
|---|---|---|---|
| Control group | 0.28 ± 0.07$^z$ | 2.09 ± 0.35 | y |
| Low temperature | 0.41 ± 0.07 | 3.36 ± 0.49 | 0.50 ± 0.61 |
| Significance | NS | NS | * |

As used herein, data$^z$ are shown as mean±standard error, "y" refers to "not detected", NS refers to "not detected", "*" and "**" refer to significant at ρ=0.05 and ρ=0.05, respectively.

Figure 2:
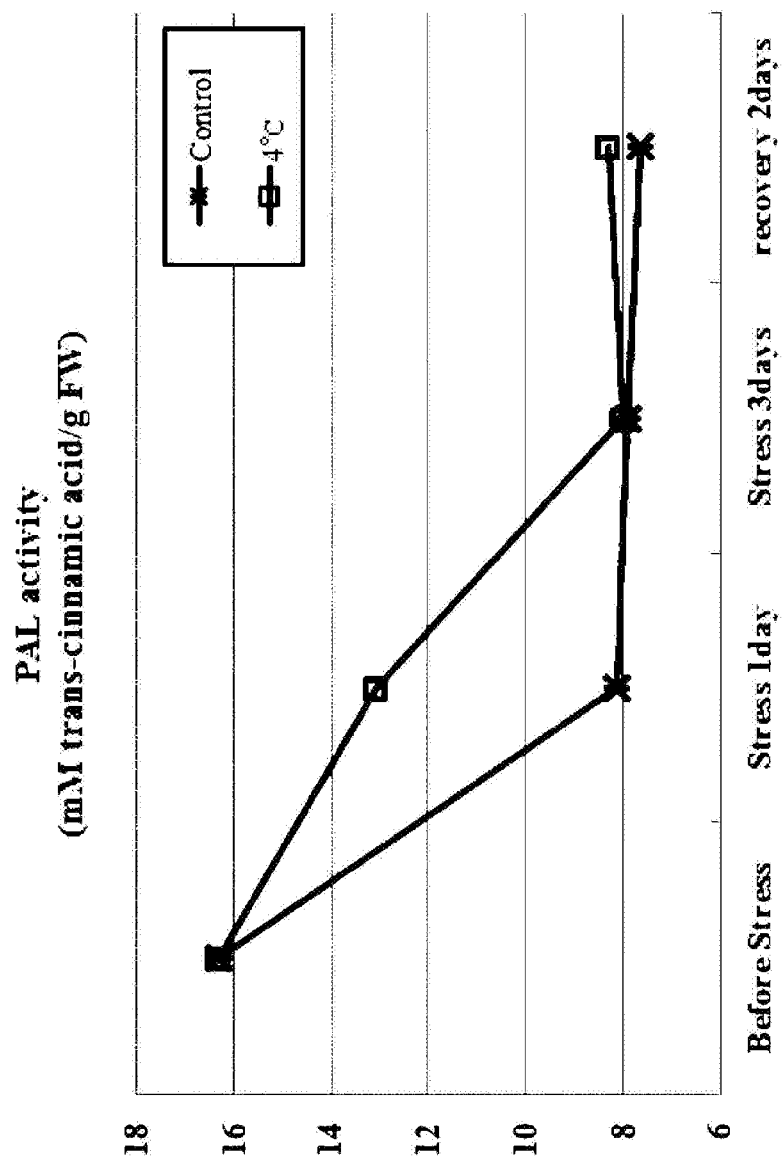
FIG. 2 is a graph depicting in phenylalanine ammonia-lyase (PAL) activity of leafy vegetables upon low temperature treatment according to an exemplary embodiment.

In addition, referring to FIG. 2, on the first day of the low temperature treatment, the treatment group was enhanced by 61% in activity of PAL (phenylalanine ammonia-lyase), which is an important enzyme in the pathway of secondary metabolite biosynthesis, as compared with the control group. On the third day of the low temperature treatment, the PAL activity of the treatment group was decreased to a substantially similar value to that of the control group and slightly increased again on the second day of recovery.

Accordingly, it was confirmed that, when the leafy vegetables were subjected to low temperature treatment, the phenol concentration and the degree of antioxidant of the leafy vegetables were increased together with the content of the individual phenolic compounds and the activity of PAL, which is an important enzyme in the pathway of secondary metabolite biosynthesis, without affecting the growth of the leafy vegetables.

EXAMPLE 2

Analysis of Enhancement of Useful Substances in Leafy Vegetables Using Light Stress For analysis of enhancement of useful substances in leafy vegetables using UV, the leafy vegetables were grown in a closed plant production system under conditions of temperature 20° C., humidity 60%, LED light sources (red:white:blue, 8:1:1), and 130 μmol/m²/s PPF for about 3 weeks. Three weeks after planting, the leafy vegetables were placed in a space irradiated with UV light from two types of UV-A LEDs (370 nm, 385 nm) at 30 W/m² for 5 days.

Figure 3:
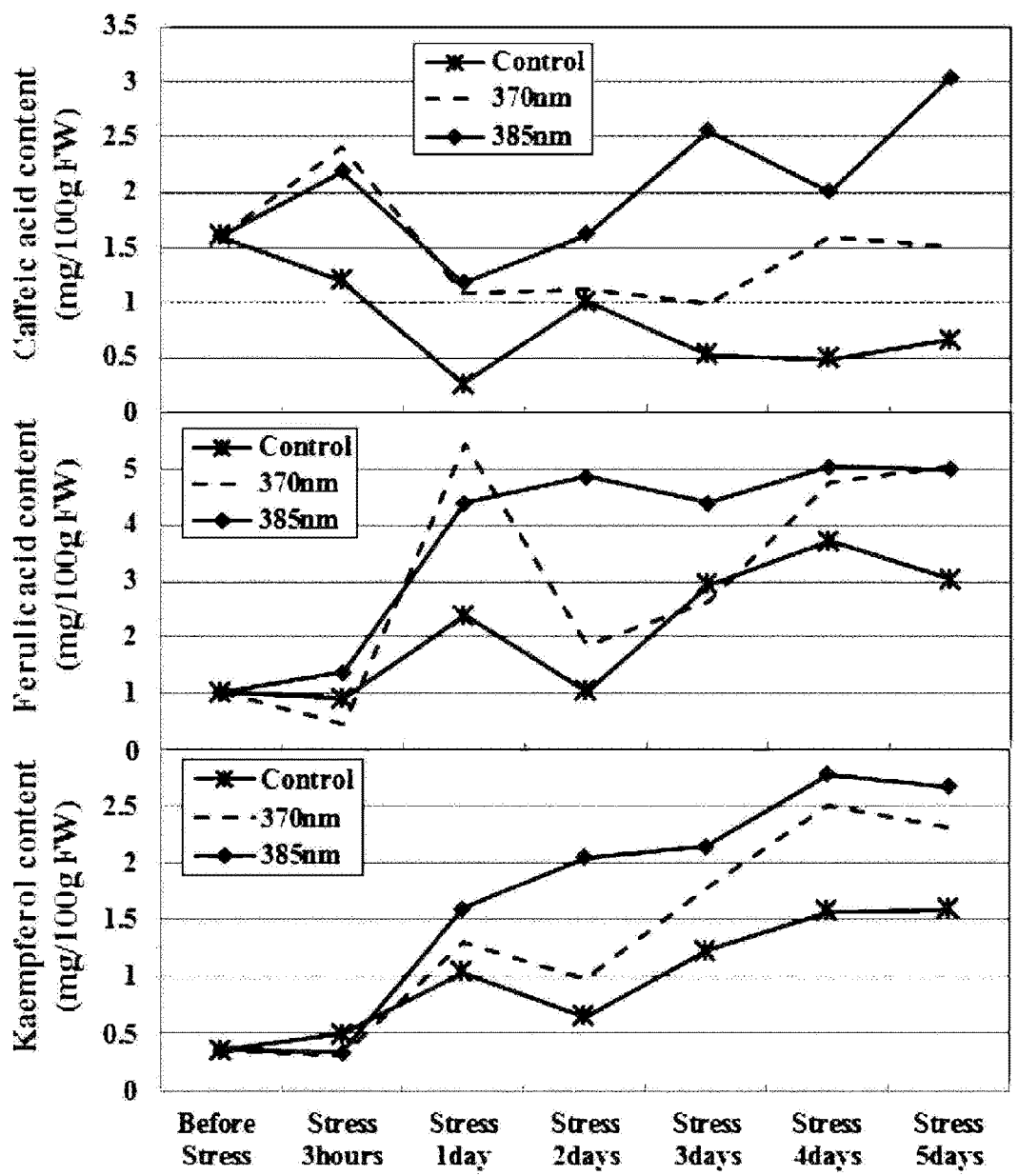
FIG. 3 is graphs depicting the content of caffeic acid, ferulic acid, and kaempferol in leafy vegetables upon treatment with UV-A LEDs (370 nm, 385 nm) according to an exemplary embodiment.

As a result, three compounds including caffeic acid, ferulic acid, and kaempferol were detected in the leaves of the leafy vegetables. It was confirmed that there was a significant difference in contents of these three compounds depending upon irradiation time with UV-A. More specifically, referring to FIG. 3, the content of caffeic acid was significantly increased by about 2 times at 370 nm, and by about 1.82 times at 385 nm after UV irradiation for 3 hours, by about 1.91 times at 370 nm and by about 4.86 times at 385 nm on the third day of UV irradiation, and by about 2.25 times at 370 nm and by about 4.55 times at 385 nm on the fifth day of UV irradiation.

There was no significant difference in content of ferulic acid in UV irradiation both at 370 nm and 385 nm. However, the content of ferulic acid was significantly increased to by about 1.67 times at 370 nm and by about 1.65 times at 385 nm on the fifth day.

In addition, there was a significant difference in kaempferol content. More specifically, the kaempferol content was significantly increased by about 1.51 times and by about 3.18 times at 370 nm and 385 nm, respectively, on the second day of UV-A treatment, and by about 1.46 times at 370 nm and by about 1.68 times at 385 nm on the fifth day of UV-A treatment.

As a result, it was confirmed that the treatment group maintained the content of all of caffeic acid, ferulic acid, and kaempfero at higher levels than the control group during UV-A treatment with both UV-A LEDs (370 nm, 385 nm).

According to these examples, it could be confirmed that the leafy vegetables cultivated under environments of low temperature stress and UVA stress had an increased content of useful substances.

EXAMPLE 3

Analysis of Enhancement of Useful Substances in Leafy Vegetables Using Low Temperature Stress and Combined Stress Leafy vegetables were grown in a closed plant production system under conditions of temperature 20° C., humidity 60%, and fluorescent lamps at 130 μmol/m²/s PPF for about 3 weeks. Three weeks after planting in the closed plant production system, the leafy vegetables were subjected to stress treatment for 3 days and recovered for 2 days. In this example, growth and useful substances of the leafy vegetables were measured during cultivation of the leafy vegetables under conditions of low stress temperature at 4° C., low stress temperature at 10° C., UVA stress, and combined stress of low temperature and UVA for 3 days, and recovery for 2 days. UVA was at least one of UVA at a wavelength of 370 nm and UVA at a wavelength of 385 nm. In this example, both UVA at a wavelength of 370 nm and UVA at a wavelength of 385 nm were used.

<3-1> Analysis of Enhancement in Growth of Leafy Vegetables Using Low Temperature Stress and Combined Stress In this example, a first treatment group consisted of leafy vegetables cultivated under a low temperature environment of 4° C. A second treatment group consisted of leafy vegetables cultivated under a low temperature environment of 10° C. A third treatment group consisted of leafy vegetables cultivated under a UVA stress environment at room temperature (20° C.). A fourth treatment group consisted of leafy vegetables cultivated under a combined stress environment of 10° C. and UVA. The control group consisted of leafy vegetables cultivated under general environments without low temperature and UVA stress.

During cultivation of leafy vegetables, the stress environments, such as low temperature and UVA irradiation, increased the content of useful substances therein.

However, excessive stress application to the leafy vegetables can damage or kill the leafy vegetables. In addition, insufficient stress application to the leafy vegetables may cause an increase in contents of the useful substances by stress difficult.

In this experiment, it was confirmed with the naked eye that the leafy vegetables was in a normal state without damage thereto, after stress treatment for 3 days and 2 days of recovery. In this example, an increase in the content of the useful substances could be indirectly assumed through measurement of stress applied to the leafy vegetables cultivated under the stress environments.

Figure 4:
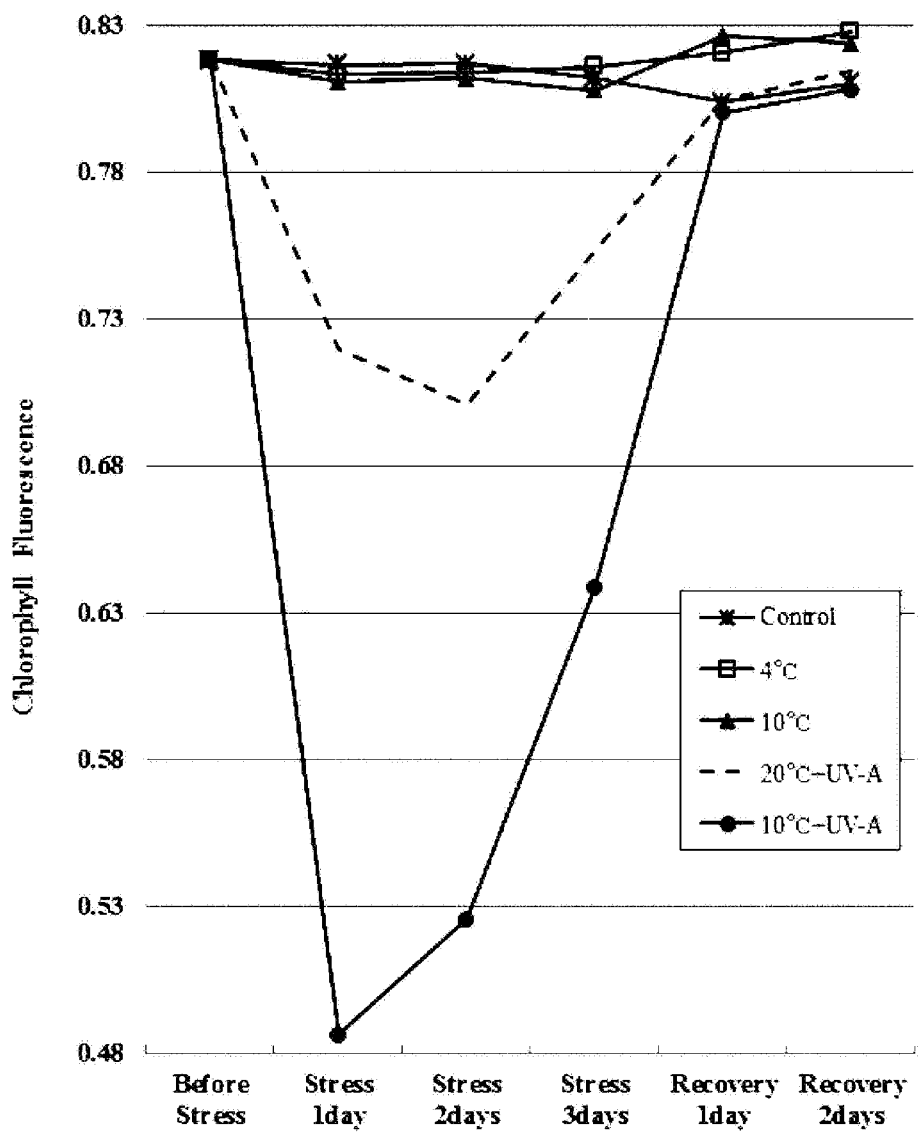
FIG. 4 is a graph depicting chlorophyll fluorescence values of a control group and first treatment group to third treatment group according to an exemplary embodiment.

Table 3 shows chlorophyll fluorescence values of the control group, and the first to third treatment groups. FIG. 4 is a graph depicting Table 4.

TABLE 3

|  | Before Stress | Stress 1 day | Stress 2 days | Stress 3 days | Recovery 1 day | Recovery 2 days |
| --- | --- | --- | --- | --- | --- | --- |
| Control | 0.8183 | 0.81665 | 0.816875 | 0.812 | 0.803875 | 0.81025 |
| 4° C. | 0.8183 | 0.813375 | 0.81375 | 0.815875 | 0.82075 | 0.82775 |
| 10° C. | 0.8183 | 0.8105 | 0.812 | 0.807875 | 0.826625 | 0.823875 |
| 20° C. + UV-A | 0.8183 | 0.719625 | 0.70075 | 0.7535 | 0.80425 | 0.81475 |
| 10° C. + UV-A | 0.8183 | 0.486375 | 0.52575 | 0.638875 | 0.800375 | 0.80825 |

Referring to Table 3 and FIG. 4, chlorophyll fluorescence values of the first treatment group and the second treatment group show no significant differences from the chlorophyll fluorescence value of the control group. In addition, the third treatment group had a slightly lower chlorophyll fluorescence value than the control group, during stress treatment. However, the fourth treatment group had a chlorophyll fluorescence value of about 0.48 to 0.64, which was significantly different from that of the control group, during stress treatment. In particular, the content of the useful substance was increased in the leafy vegetables under a combined stress environment of low temperature and UVA.

FIG. 5 to FIG. 11 are graphs depicting the growth of leafy vegetables on the second day of recovery after combined stress treatment.

Figure 5:
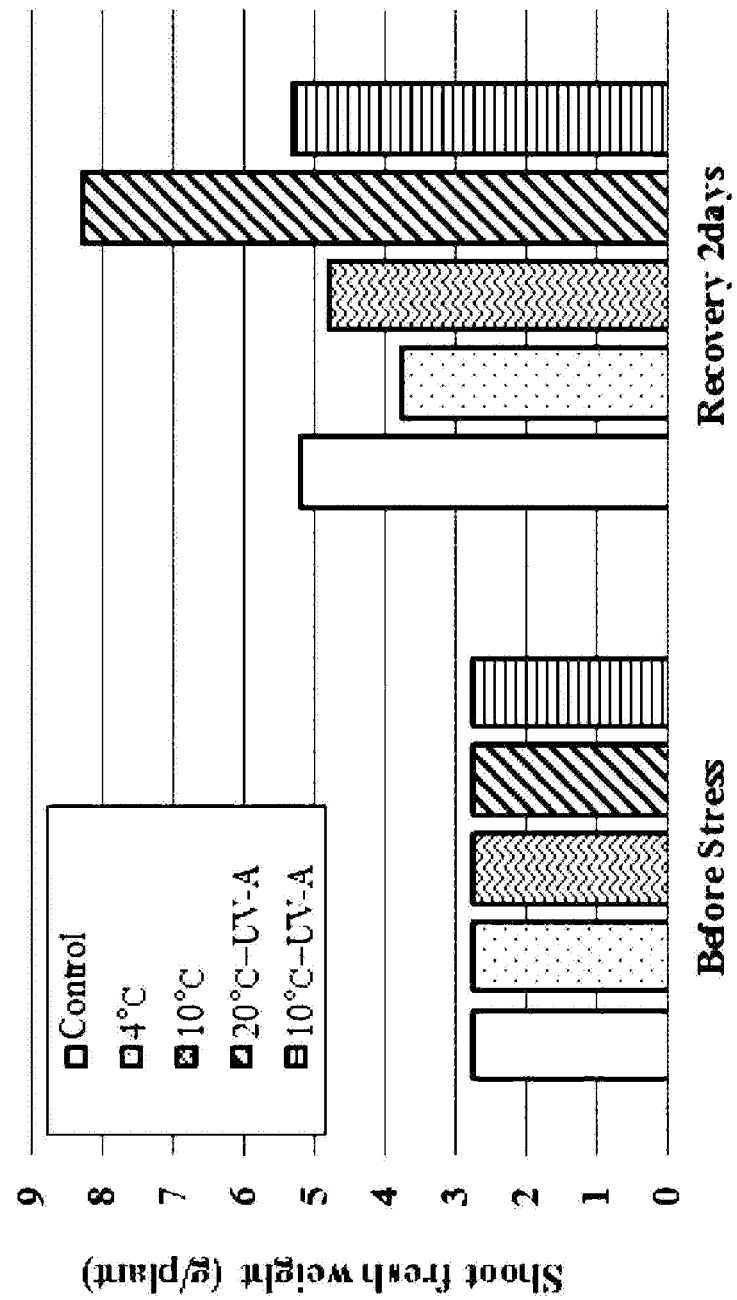
FIGS. 5, 6, 7, 8, 9, 10, and 11 are graphs depicting growth of leafy vegetables subjected to stress treatment according to exemplary embodiments.
Figure 6:
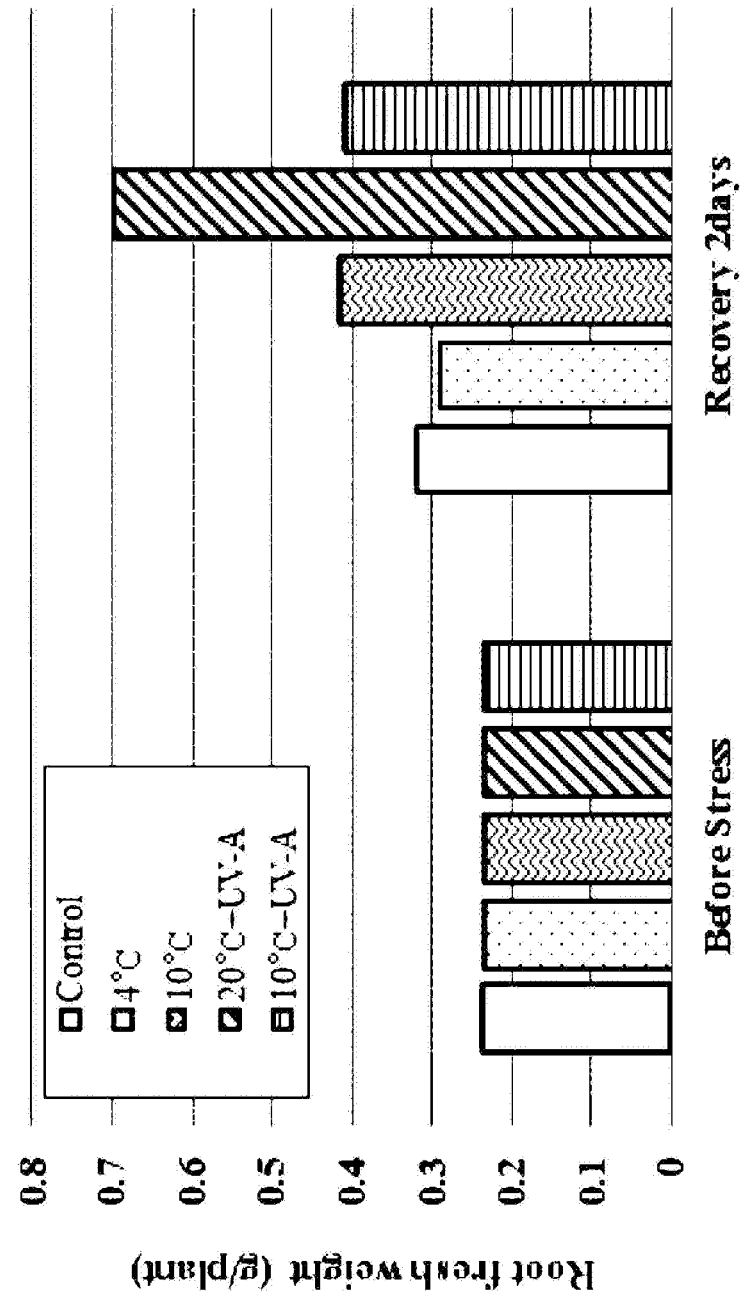

FIG. 5 is a graph depicting shoot fresh weights, and FIG. 6 is a graph depicting root fresh weights. In addition, FIG. 7 is a graph depicting shoot dry weights and FIG. 8 is a graph depicting root dry weights.

Referring to FIG. 5, the third treatment group exhibited a greater increase in shoot fresh weight than the control group and the other treatment groups on the second day of recovery. Here, it can be seen that, although other treatment groups had a lower shoot fresh weights than the shoot of the control group, the shoot fresh weights of the other treatment groups were increased than before the stress treatment.

Referring to FIG. 6, the third treatment group exhibited a greater increase in root fresh weight than the control group and the other treatment groups on the second day of recovery. The second treatment group and fourth treatment group had higher root fresh weights than the control group. In addition, it can be seen that, although the first treatment group had a lower root fresh weight than the control group, the root fresh weight of the first treatment group was increased than before the stress treatment.

Figure 7:
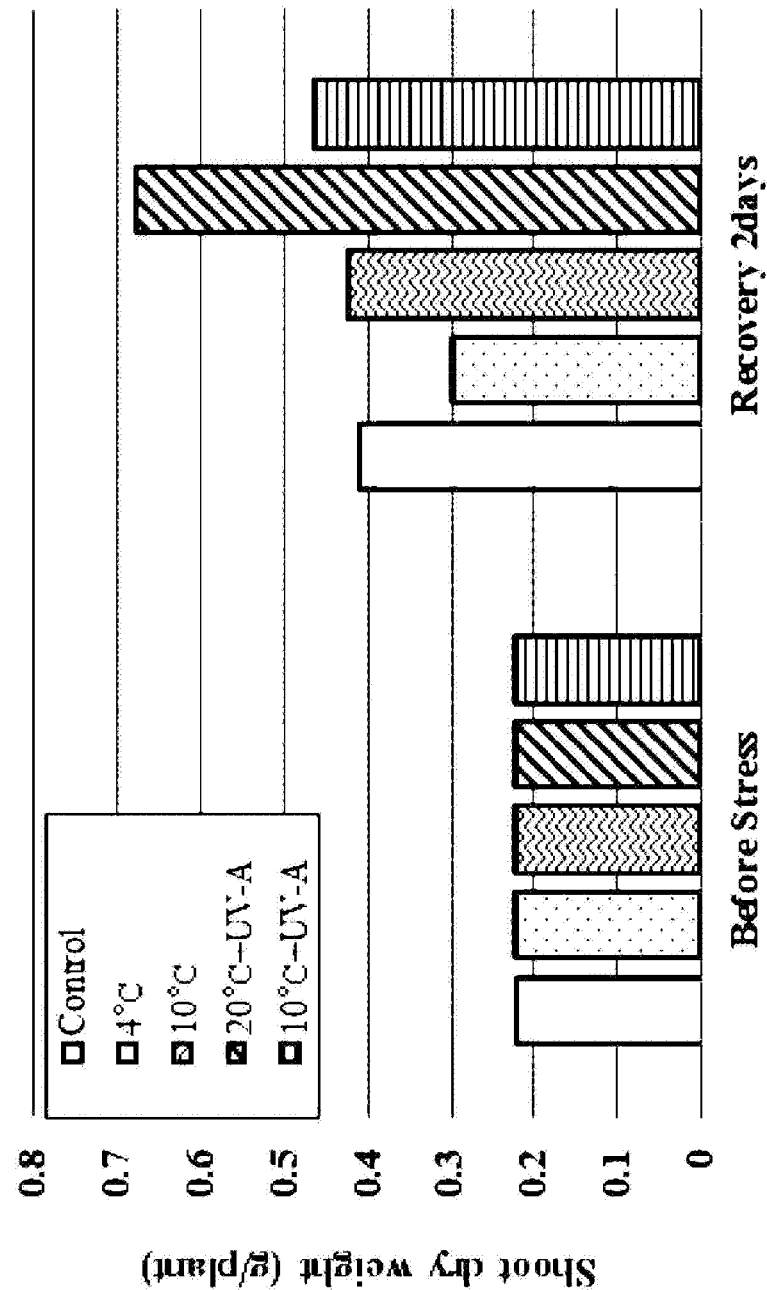
Figure 8:
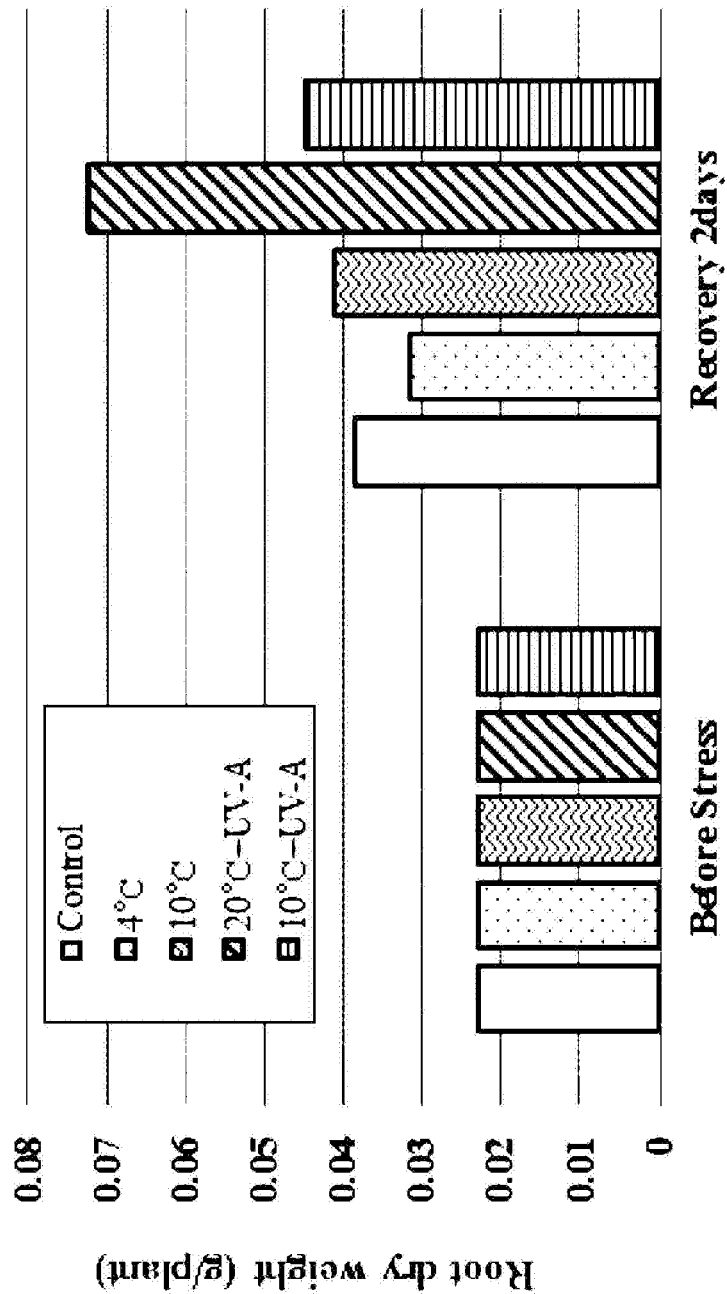

Referring to FIG. 7, the third treatment group exhibited a greater increase in shoot dry weight than the control group and the other treatment groups on the second day of recovery. The second treatment group and fourth treatment group had shoot dry weights higher than the control group. In addition, it can be seen that, although the first treatment group had a lower shoot dry weight than the control group, the shoot dry weight of the first treatment group was increased than before the stress treatment.

Referring to FIG. 8, the third treatment group exhibited a greater increase in root dry weight than the control group and the other treatment groups on the second day of recovery. The second treatment group and fourth treatment group had root dry weights higher than the control group. In addition, it can be seen that, although the first treatment group had a lower root dry weight than the control group, the root dry weight of the first treatment group was increased than before the stress treatment.

Figure 9:
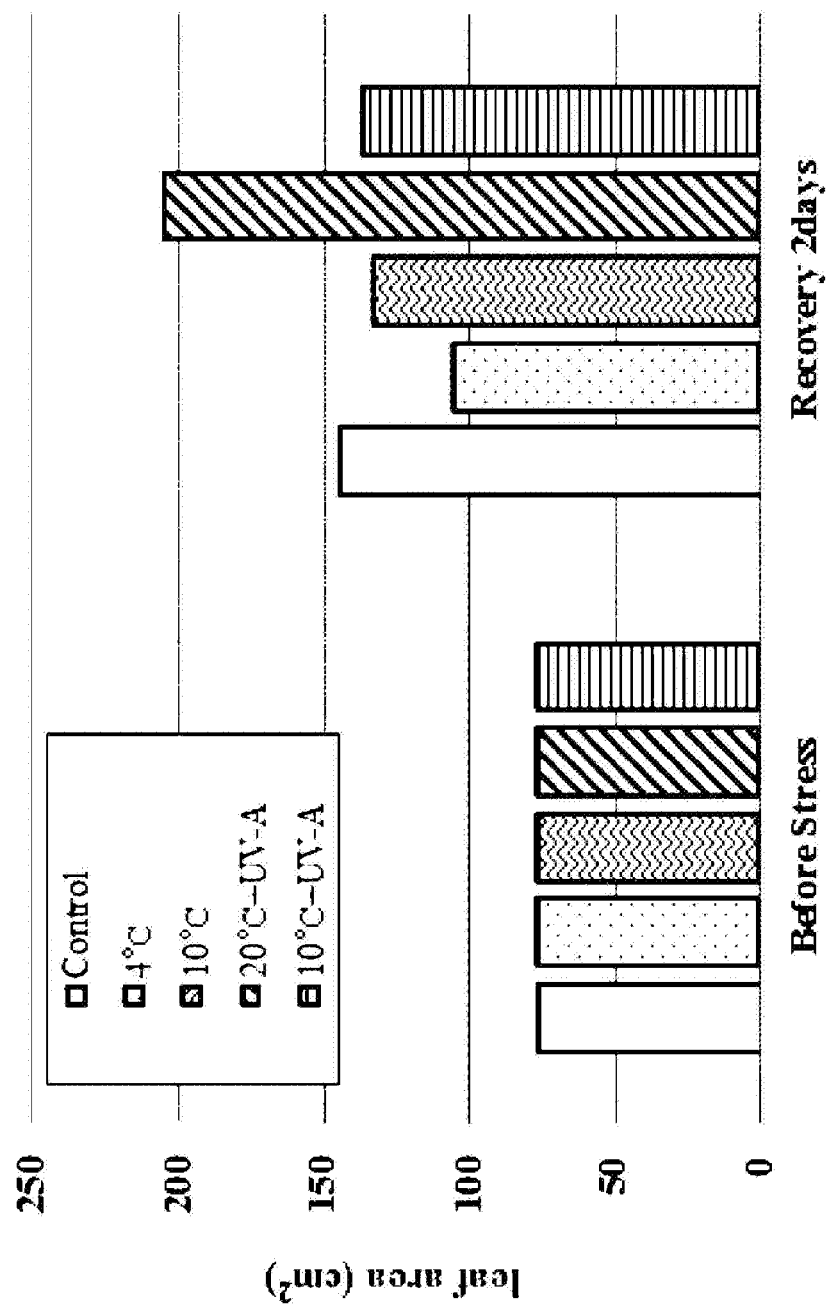
Figure 10:
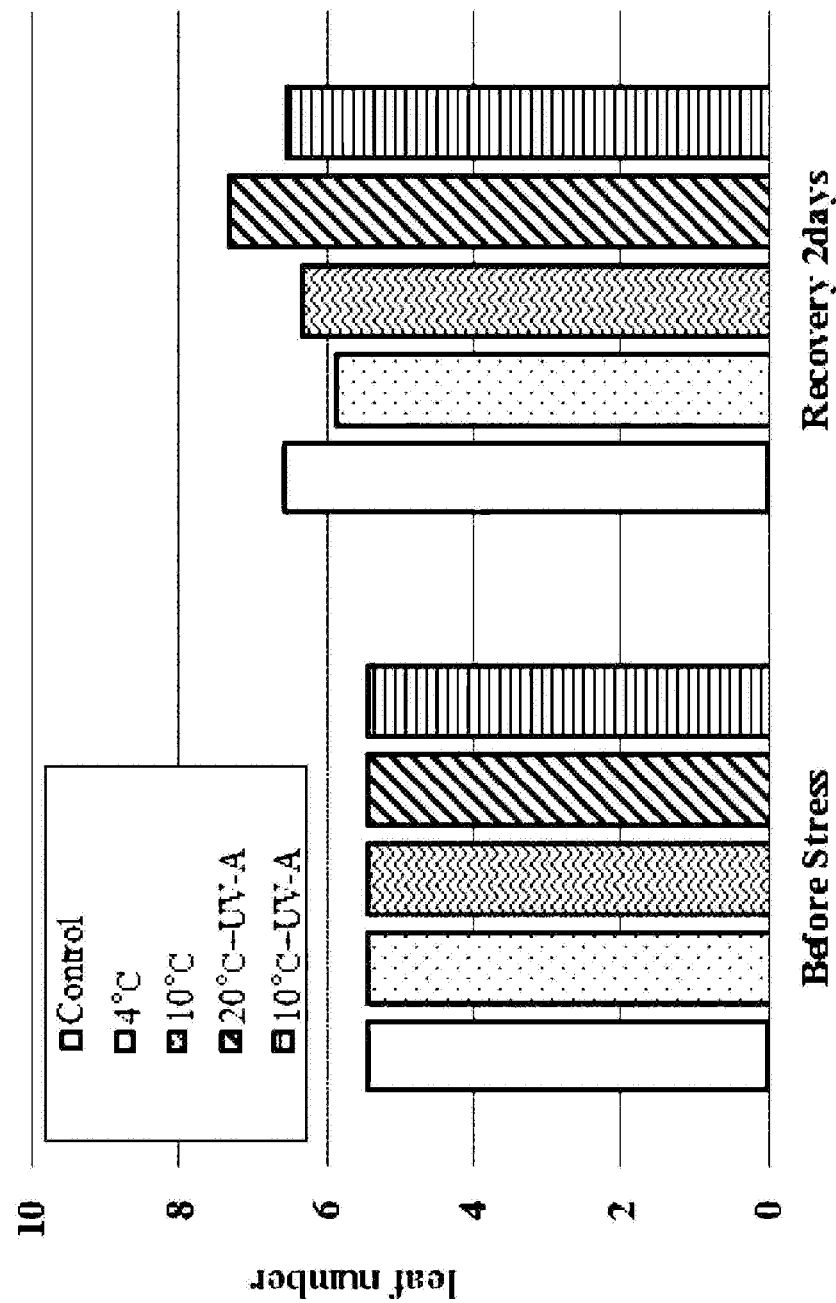
Figure 11:
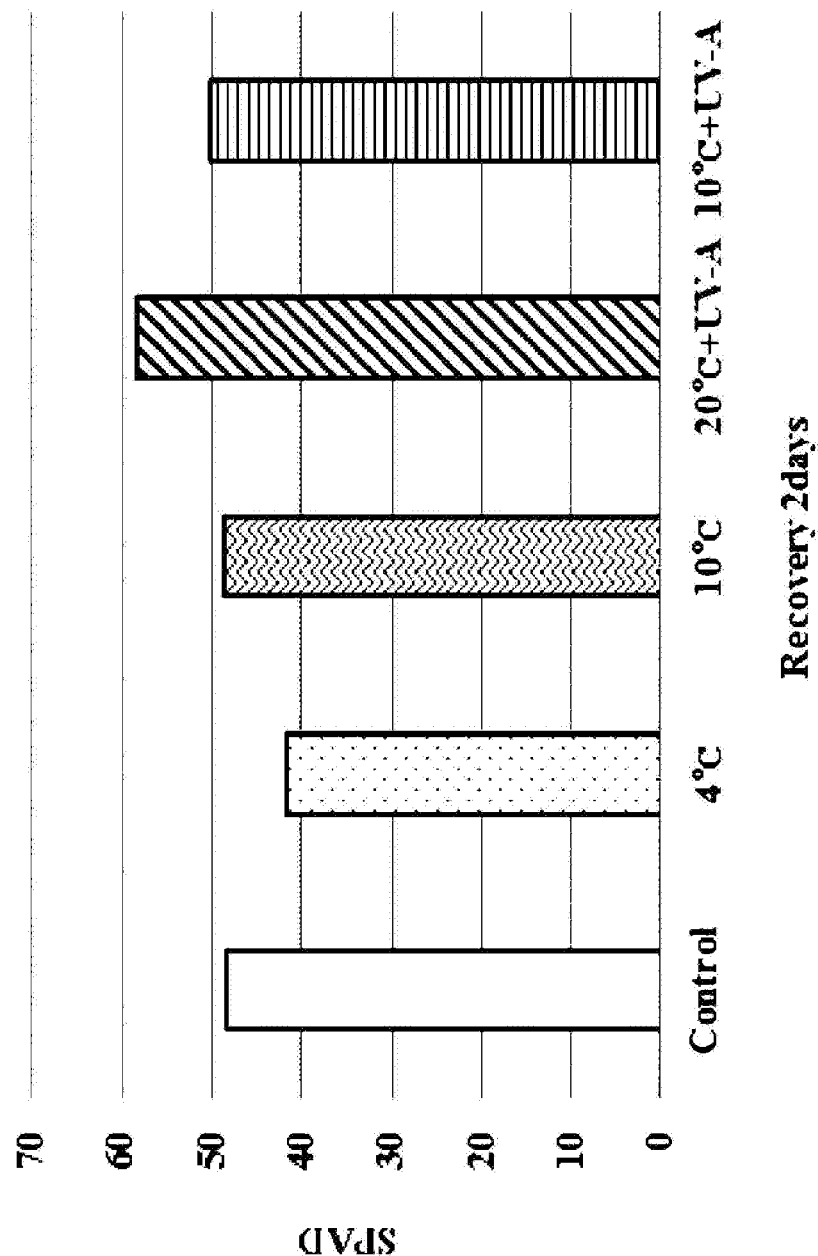

FIG. 9 is a graph depicting leaf areas, FIG. 10 is a graph depicting the number of leaves, and FIG. 11 is a graph depicting the content of chlorophyll (SPAD).

Referring to FIG. 9, the third treatment group exhibited a greater increase in leaf area than the control group and the other treatment groups on the second day of recovery. Here, it can be seen that, although the other treatment groups had lower leaf areas than the control group, the leaf areas of the other treatment groups were increased than before the stress treatment.

Referring to FIG. 10, the third treatment group exhibited a greater increase in the number of leaves than the control group and the other treatment groups on the second day of recovery. Here, it can be seen that, although the other treatment groups had smaller number of leaves than the control group, the number of leaves of the other treatment groups was increased than before the stress treatment.

Referring to FIG. 11, it can be seen that the third treatment group and fourth treatment group had higher contents of chlorophyll than the control group. The second treatment group had a similar content of chlorophyll as the control group.

As such, it can be seen that all of the first treatment group to the fourth treatment group exhibited enhancement of growth than before the stress treatment. That is, low temperature stress at 4° C., and low temperature stress at 10° C., UVA stress, or combined stress of a low temperature of 10° C. and UVA for 3 days enhanced growth of the leafy vegetables rather than causing a problem in the growth thereof.

Figure 12:
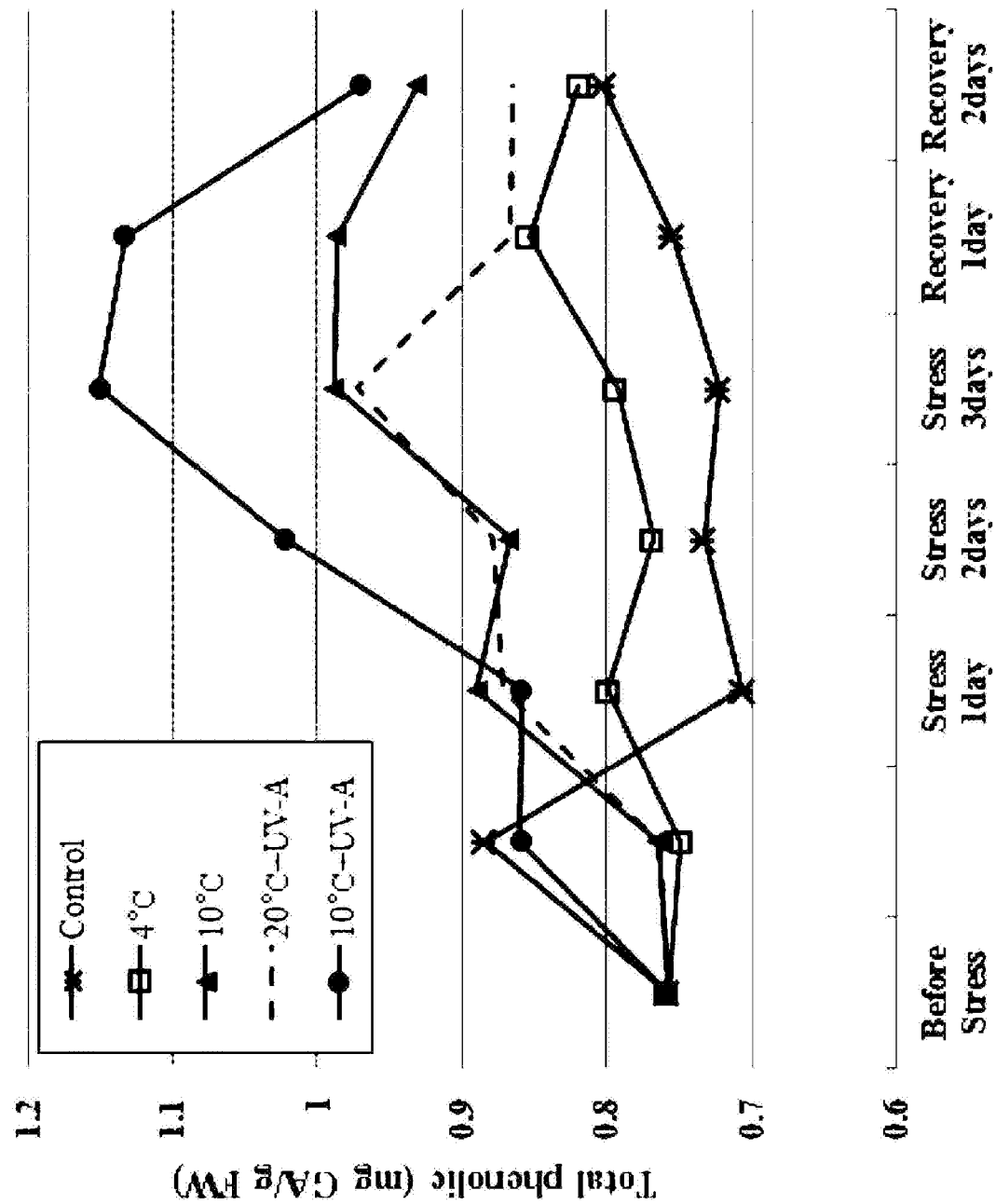
FIG. 12 and FIG. 13 are graphs depicting variation in content of useful substances in leafy vegetables during a stress treatment period and a recovery period according to exemplary embodiments.
Figure 13:
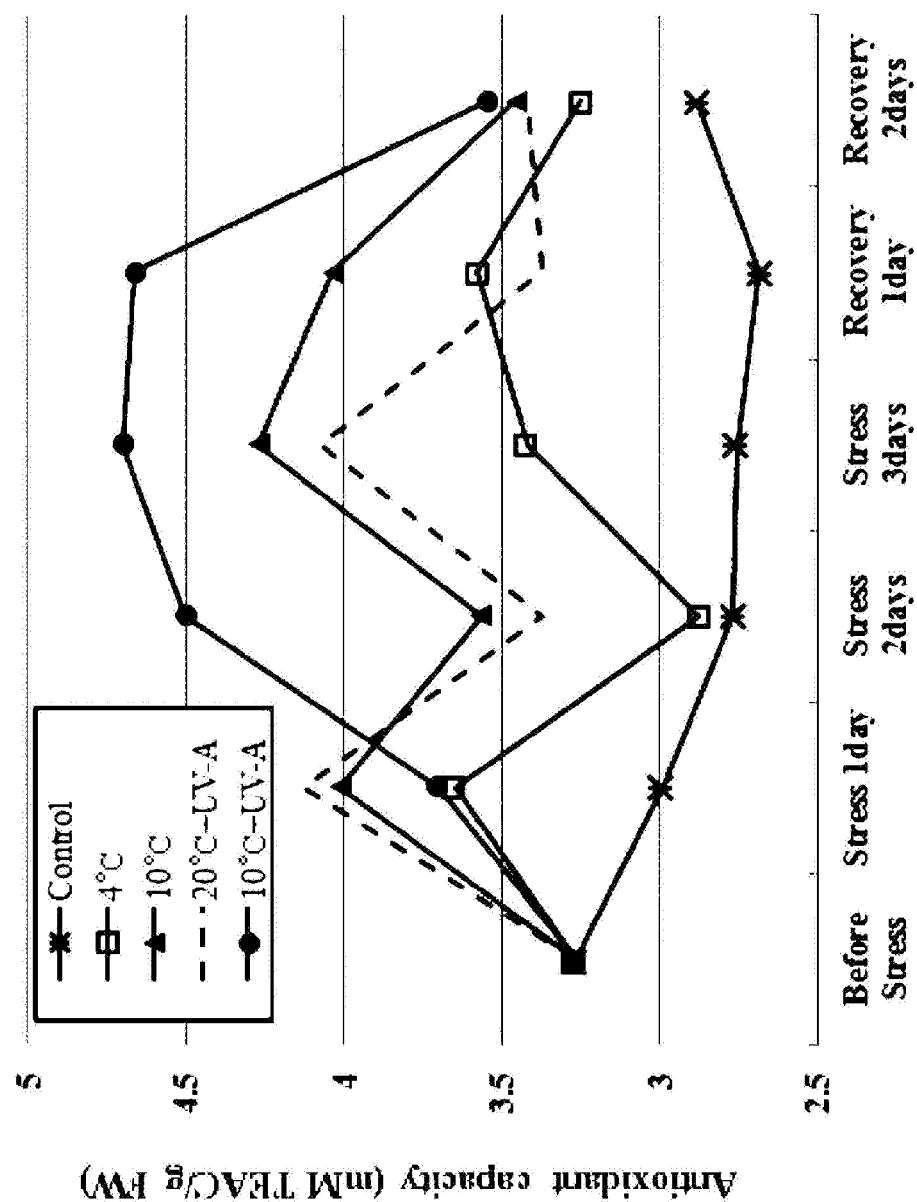

<3-2> Analysis of Useful Substances of Leafy Vegetables Using Low Temperature Stress and Combined Stress FIG. 12 and FIG. 13 are graphs depicting variation in content of useful substances in leafy vegetables during a stress treatment period and a recovery period.

FIG. 12 is a graph depicting variation in total phenol content of leafy vegetables.

All of the first treatment group to fourth treatment group had higher total phenol contents than the control group from the first day of stress treatment. In particular, the third treatment group exhibited a greater increase in total phenol content than the other treatment groups and the control group on the third day of stress treatment and on the first day of recovery.

FIG. 13 is a graph depicting the degree of antioxidant of leafy vegetables.

All of the first treatment group to fourth treatment group had higher degrees of antioxidant than the control group from the beginning of stress treatment. In particular, the third treatment group exhibited a greater increase in antioxidant capacity than the other treatment groups and the control group on the third day of stress treatment and on the first day of recovery.

According to the exemplary embodiments of the present invention, it can be confirmed that the leafy vegetables were not damaged and exhibited the highest increase in the content of useful substances under a combined stress environment of low temperature and UVA.

When the leafy vegetables are subjected only to low temperature stress at 4° C. to increase the content of the useful substances, high power supply may be required to maintain the low temperature of 4° C.

However, since application of combined stress of low temperature and UVA provides the low temperature stress and UVA stress at the same time, the content of the useful substances can be sufficiently increased at a low temperature that is higher than 4° C.

Since application of such combined stress of low temperature and UVA is performed at a higher temperature than application of low temperature stress of 4° C. to the leafy vegetables, it is possible to reduce power consumption that would otherwise be required for cooling. Furthermore, the combined stress of low temperature and UVA can generate the maximum content of useful substances in the leafy vegetables in a shorter time than application of stress using only UVA light.

Accordingly, treatment with combined stress of low temperature and UVA according to exemplary embodiments may increase the content of useful substances in the leafy vegetables in efficient manner.

Some exemplary embodiments have been described herein. However, it should be understood that various modifications, variations, and alterations can be made by those skilled in the art without departing from the spirit and scope of the present invention. Therefore, it should be understood that the embodiments disclosed herein are provided for illustration only and are not to be construed as limiting the scope of the present invention.

The invention claimed is:

1. A method for reducing power consumption in a closed plant production system for enhancing growth and useful substances of leafy vegetables using an environmental stress comprising a combined stress of low temperature and UVA light, wherein the low temperature is equal to or greater than 10° C. but less than 20° C., and wherein the leafy vegetables are subjected to the combined stress for 3 days.

2. The method according to claim 1, wherein the useful substances comprise caffeic acid, ferulic acid, or kaempferol.

3. The method according to claim 1, wherein the growth comprises increase in fresh weight or dry weight of the leafy vegetables.

4. The method according to claim 1, wherein the UVA light comprises light having a wavelength of 370 nm or light having a wavelength of 380 nm.

5. The method according to claim 1, wherein the leafy vegetables are harvested after treatment with the combined stress for 3 days.

6. The method according to claim 1, wherein the leafy vegetables are harvested after treatment with the combined stress for 3 days and recovery for 1 day.

7. The method according to claim 1, wherein the useful substances comprise phenol or an antioxidant substance.

8. The method according to claim 1, wherein the growth comprises an increase in leaf area, leaf number, or chlorophyll content of the leafy vegetables.

9. The method according to claim 1, wherein the leafy vegetables are grown for at least 5 weeks before an application of the environmental stress.

10. The method according to claim 9, wherein the leafy vegetables are applied with the environmental stress for at least 3 days, and then are placed in the temperature about 20° C. for at least 2 days.

11. The method according to claim 1, wherein the environmental stress comprises a first exposure of the leafy vegetables to ultraviolet (UV) light.

\* \* \* \* \*